(12) United States Patent
Mukaida et al.

(10) Patent No.: US 7,403,965 B2
(45) Date of Patent: Jul. 22, 2008

(54) ENCRYPTION/DECRYPTION SYSTEM FOR CALCULATING EFFECTIVE LOWER BITS OF A PARAMETER FOR MONTGOMERY MODULAR MULTIPLICATION

(75) Inventors: Kenji Mukaida, Kawasaki (JP); Masahiko Takenaka, Kawasaki (JP); Naoya Torii, Kawasaki (JP); Shoichi Masui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 10/888,991

(22) Filed: Jul. 13, 2004

(65) Prior Publication Data

US 2005/0165875 A1    Jul. 28, 2005

(30) Foreign Application Priority Data

Jan. 26, 2004    (JP)    ............................ 2004-017206

(51) Int. Cl.
*G06F 7/00*    (2006.01)
(52) U.S. Cl. ..................................... 708/492
(58) Field of Classification Search ................... 708/492
See application file for complete search history.

(56) References Cited

U.S. PATENT DOCUMENTS

2003/0208518 A1* 11/2003 Gura et al. .................. 708/492

2004/0167952 A1* 8/2004 Gueron et al. ............... 708/492

FOREIGN PATENT DOCUMENTS

JP    2002-207589    7/2002

OTHER PUBLICATIONS

Peter L. Montgomery, "Modular Multiplication Without Trial Division," Mathematics of Computation, vol. 44, No. 170, Apr. 1985, pp. 519-521.
z,701 etin Kaya Koç, "High-Speed RSA Implementation," RSA Laboratories, RSA Data Security, Inc., Version 2.0, Nov. 1994, pp. 48-49.

* cited by examiner

*Primary Examiner*—Tan V. Mai
(74) *Attorney, Agent, or Firm*—Arent Fox LLP; Charles M. Marmelstein

(57) ABSTRACT

An arithmetic device for Montgomery modular multiplication which quickly calculates a parameter ND, the parameter ND satisfying $R \times R^{-1} - N \times ND = 1$ for an integer N and a radix R that is coprime to and greater than N, with a large number of effective lower bits. The device comprises an ND generator, a multiplication-accumulation (MAC) operator, and a sum data store. The ND generator produces effective lower bits of ND at a rate of k bits per clock cycle, with reference to lower k bits of a variable S, as well as to lower k bits of an odd positive integer N. The MAC operator multiplies the produced k-bit ND value by N and adds the resulting product to S. The sum data store stores the variable S, which is updated with the output of the MAC operator, with its bits shifted right by k bits, for use by the ND generator in the subsequent clock cycle.

17 Claims, 8 Drawing Sheets

```
Input  N;     //Effective lower bits of N
Output ND;    //Effective lower bits of ND
S := 0
ND := 0
for (i=0 to s-1 step 2) {
  if      ((S[1],S[0],N[1]) == 000) {(ND[i+1],ND[i]):= 11}
  else if ((S[1],S[0],N[1]) == 001) {(ND[i+1],ND[i]):= 01}
  else if ((S[1],S[0],N[1]) == 010) {(ND[i+1],ND[i]):= 10}
  else if ((S[1],S[0],N[1]) == 011) {(ND[i+1],ND[i]):= 10}
  else if ((S[1],S[0],N[1]) == 100) {(ND[i+1],ND[i]):= 01}
  else if ((S[1],S[0],N[1]) == 101) {(ND[i+1],ND[i]):= 11}
  else if ((S[1],S[0],N[1]) == 110) {(ND[i+1],ND[i]):= 00}
  else if ((S[1],S[0],N[1]) == 111) {(ND[i+1],ND[i]):= 00}
  S := S + N*(ND[i+1],ND[i]) >> 2
}
Return ND
```

FIG. 4

```
// Computational operations to generate ND
     if ((ND[i-1],S[1],S[0],N[1]) == 0000) {(ND[i+1],ND[i]) := 11}
else if ((ND[i-1],S[1],S[0],N[1]) == 0001) {(ND[i+1],ND[i]) := 01}
else if ((ND[i-1],S[1],S[0],N[1]) == 0010) {(ND[i+1],ND[i]) := 10}
else if ((ND[i-1],S[1],S[0],N[1]) == 0011) {(ND[i+1],ND[i]) := 10}
else if ((ND[i-1],S[1],S[0],N[1]) == 0100) {(ND[i+1],ND[i]) := 01}
else if ((ND[i-1],S[1],S[0],N[1]) == 0101) {(ND[i+1],ND[i]) := 11}
else if ((ND[i-1],S[1],S[0],N[1]) == 0110) {(ND[i+1],ND[i]) := 00}
else if ((ND[i-1],S[1],S[0],N[1]) == 0111) {(ND[i+1],ND[i]) := 00}
else if ((ND[i-1],S[1],S[0],N[1]) == 1000) {(ND[i+1],ND[i]) := 10}
else if ((ND[i-1],S[1],S[0],N[1]) == 1001) {(ND[i+1],ND[i]) := 00}
else if ((ND[i-1],S[1],S[0],N[1]) == 1010) {(ND[i+1],ND[i]) := 01}
else if ((ND[i-1],S[1],S[0],N[1]) == 1011) {(ND[i+1],ND[i]) := 01}
else if ((ND[i-1],S[1],S[0],N[1]) == 1100) {(ND[i+1],ND[i]) := 00}
else if ((ND[i-1],S[1],S[0],N[1]) == 1101) {(ND[i+1],ND[i]) := 10}
else if ((ND[i-1],S[1],S[0],N[1]) == 1110) {(ND[i+1],ND[i]) := 11}
else if ((ND[i-1],S[1],S[0],N[1]) == 1111) {(ND[i+1],ND[i]) := 11}

// MAC operation with Booth's algorithm
     if ((ND[i+1], ND[i], ND[i-1]) == 011) S := (S + (N<<1)) >> 2
else if ((ND[i+1], ND[i], ND[i-1]) == 010) S := (S + (N)) >> 2
else if ((ND[i+1], ND[i], ND[i-1]) == 001) S := (S + (N)) >> 2
else if ((ND[i+1], ND[i], ND[i-1]) == 000) S := (S) >> 2
else if ((ND[i+1], ND[i], ND[i-1]) == 111) S := (S) >> 2
else if ((ND[i+1], ND[i], ND[i-1]) == 110) S := (S + (!N)) >> 2
else if ((ND[i+1], ND[i], ND[i-1]) == 101) S := (S + (!N)) >> 2
else if ((ND[i+1], ND[i], ND[i-1]) == 100) S := (S + (!N<<1)) >> 2
```

FIG. 5

```
Input  N;              // Lower s bits of N
Output  ND;            // Lower s bits of ND
S := 0
for ( i=0 to s-1 ) {
  if( S[0] == 0 ) {
    ND[i] := 1
    S := ( S + N ) >> 1
  }
  else {
    ND[i] := 0
    S := S >> 1
  }
}
Return ND
```

FIG. 7

*PRIOR ART*

ENCRYPTION/DECRYPTION SYSTEM FOR CALCULATING EFFECTIVE LOWER BITS OF A PARAMETER FOR MONTGOMERY MODULAR MULTIPLICATION

CROSS-REFERENCE TO RELATED APPLICATIONS

This application is based upon and claims the benefits of priority from the prior Japanese Patent Application No. 2004-017206, filed on Jan. 26, 2004, the entire contents of which are incorporated herein by reference.

BACKGROUND OF THE INVENTION

1. Field of the Invention

The present invention relates to an arithmetic device containing multiplier-accumulator circuitry. More particularly, the present invention relates to an arithmetic device that calculates effective lower bits of a parameter ND for Montgomery modular multiplication, where ND satisfies a mathematical condition $R \times R^{-1} - N \times ND = 1$ for an integer N and a radix R that is coprime to and greater than N.

2. Description of the Related Art

Recent years have seen a rapid growth of online trade market, also known as electronic commerce (e-commerce), where commercial transactions involving money transfers take place over a network. People are exchanging personal information such as their credit card numbers over a network more frequently than ever before. Such important personal information has to be protected from eavesdropping and tampering attacks by a malicious third party. The use of cryptographic techniques is thus mandatory to ensure the security of information transfer.

Public-key systems, one of the modern cryptographic algorithms, use a pair of cryptographic keys called public and private keys. The sender encrypts his/her message with the receiver's public key, and the receiver decrypts the received message with his/her secret private key. Suppose, for example, that a person is purchasing a product at an online store. The online store sends their public key to the purchaser, allowing him/her to send his/her credit card number and other information in encrypted form. The store can decode the received information by using their private key. The advantage of public-key systems is that the public key is made available to the public. That is; public-key cryptosystems permit one to achieve secure communication with anyone who have publicized their encryption keys.

One example of a public-key algorithm is RSA, named after its three creators: Ron Rivest, Adi Shamir, and Leonard Adleman. The RSA cryptosystem uses a modular multiplication process to ensure the secrecy of ciphertext, relying on the difficulty of prime factorization of a large integer. That is, when a certain number x and an integer n are given, it is relatively easy for a computer to calculate a power of x modulo n (remainder of division by n). But, because of the difficulty of prime factorization, it is very hard to accomplish the reverse process when n is large, meaning that the original number x cannot be reproduced easily. RSA is grounded on this nature of modular arithmetic.

RSA, however, requires a larger amount of computation for modular multiplication than symmetric cryptosystems such as the Data Encryption Standard (DES), and this fact leads to demands for a faster algorithm. Montgomery modular multiplication method is one of the solutions for reducing computational burden. When a radix R coprime to an integer N is selected such that R>N, the Montgomery algorithm computes $T \times R^{-1}$ mod N (i.e., remainder of division of $T \times R^{-1}$ by integer N) from an input value T satisfying $0 \leq T \leq R \times N$, where modulus N is represented as an irreducible polynomial of degree N. This algorithm is suitable for "modulo N" computation particularly when the integer N is very large. For details, see: P. L. Montgomery, "Modular Multiplication without Trial Division," Mathematics of Computation, Vol. 44, No. 170, pp. 519-521, 1985.

To implement the Montgomery algorithm, it is necessary to obtain a parameter ND that satisfies the condition of $R \times R^{-1} - N \times ND = 1$, where $R^{-1}$ denotes the multiplicative inverse element of radix R, modulo N. It is known that ND can be obtained by applying the Euclidean algorithm to radix R and integer N, where the process of repeating divisions yields all digits of an ND value. While ND is a multiple-precision data word, we know that Montgomery modular multiplication requires not all bits of ND as its input parameter, but only a limited number of lower bits of ND. In this description, we use the term "effective lower bits" to refer to this limited range of lower bits of ND that are relevant to Montgomery modular multiplication.

Some algorithms for calculating ND take advantage of the fact that the effective lower bits of $N \times ND$ are all ones (e.g., 0xffffffff when lower 32 bits are used in modular multiplication). See, for example, Ç. K. Koç, "High-Speed RSA Implementation," Technical Report TR 201, RSA Laboratories, Version 2.0, November, 1994, pp. 48-49. The following section will describe how this type of algorithm works.

FIG. 7 shows a conventional algorithm for calculating ND. The algorithm is represented in the form of a program code, where s (lowercase letter) denotes the number of lower bits of ND that are relevant to the calculation, and the number or symbol in square brackets following each variable S, N, or ND represents a particular bit position. The bit position is counted in the direction from the least significant bit (LSB) to the most significant bit (MSB). For example, S[0] means the LSB of variable S, and ND[i] means the (i+1)th bit of ND, counted from its LSB.

The algorithm starts with initialization of variable S and then repeats the following process for i=0 to s−1. Specifically, ND[i] will be set to one (ND[i]:=1) and N is added to S, if S[0] is zero. (Note that the addition takes effect only on the effective lower bits, and this holds true in the rest of this section.) The resulting sum is then shifted to the right by one bit, as indicated by the operator ">>1" in FIG. 7, before it is put in place of S. If S[0] is one, ND[i] is set to zero, and S is shifted right by one bit.

FIG. 8 shows the structure of a conventional arithmetic circuit for calculating ND. As an implementation of the algorithm described in FIG. 7, the illustrated arithmetic circuit 800 is composed of the following elements: a multiplexer 801, a two-input adder 802, a sum register 803, an inverter 804, and an ND register 805. The multiplexer 801 selects either N or zero (i.e., determines whether to add N to S), depending on the current value of S. The two-input adder 802 performs addition of the selected value and variable S. The sum register 803 stores the resulting sum S, while the ND register 805 stores ND.

Suppose that the sum register 803 has been initialized to zero. The multiplexer 801 determines whether to add N to S, depending on S[0], the current LSB of variable S. When S[0]==0, meaning that addition should take place, the multiplexer 801 selects and supplies N to the two-input adder 802. Otherwise, it selects and supplies zero to the two-input adder 802. The two-input adder 802 adds the selected value to the variable S read out of the sum register 803, shifts the result to the right by one bit, and stores it back into the sum register 803. The inverter 804 supplies the ND register 805 with an inverted version of the current S[0] as the bit of ND. The ND register 805 is a shift register designed to shift the data rightward each time a new bit arrives at its MSB end. The ND register 805 will thus yield a complete ND value when the predetermined number(s) of iterations are completed.

Carry delay time of the two-input adder 802 can be a critical factor in performance when ND has a large number of effective lower bits. For high-speed applications, carry-save adders (CSA) are thus preferred. Specifically, the carry output is saved in a carry register, aside from the sum output. A carry-save adder sums up three input values (N, S, carry) to yield ND.

SUMMARY OF THE INVENTION

The present invention provides an arithmetic device that calculates effective lower bits of a parameter ND for Montgomery modular multiplication, where the parameter ND satisfies $R*R^{-1} - N*ND = 1$ for an integer N and a radix R that is coprime to and greater than N. The arithmetic device comprises an ND generator, a multiplication-accumulation (MAC) operator, and a sum data store. The ND generator produces effective lower bits of an ND value at a rate of k bits per clock cycle, with reference to lower k bits of a variable S, as well as to lower k bits of the integer N. The MAC operator multiplies the produced k-bit ND value by the integer N and adds the resulting product to the variable S. The sum data store stores the variable S, wherein the variable S is updated with the output of the MAC operator, with its bits shifted right by k bits, for use by the ND generator in the subsequent clock cycle.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows an algorithm implemented in the arithmetic device according to the present embodiment of the invention.

FIG. 5 shows an algorithm implemented in the multiplier-accumulator according to the present embodiment of the invention, particularly in the case where the Booth's algorithm is used.

FIG. 7 shows a conventional algorithm for calculating an ND value.

DESCRIPTION OF THE PREFERRED EMBODIMENTS

In the section of "Description of the Related Art," we have described conventional arithmetic circuits and their algorithms for calculating ND values. Those conventional circuits consume as many processing clock cycles as the number of effective lower bits of ND. To implement the Montgomery algorithm, the modular multiplication circuit is required to handle as many effective lower digits as 512 bits, for example. In that case, the computation needs 512 clock cycles to yield an ND value, failing to offer the expected performance. It is therefore an object of the present invention to provide a high-speed arithmetic device that quickly calculates many effective lower bits of a parameter ND for Montgomery modular multiplication.

Referring now to the accompanying drawings, the following will describe an embodiment of the present invention.

Figure 1:
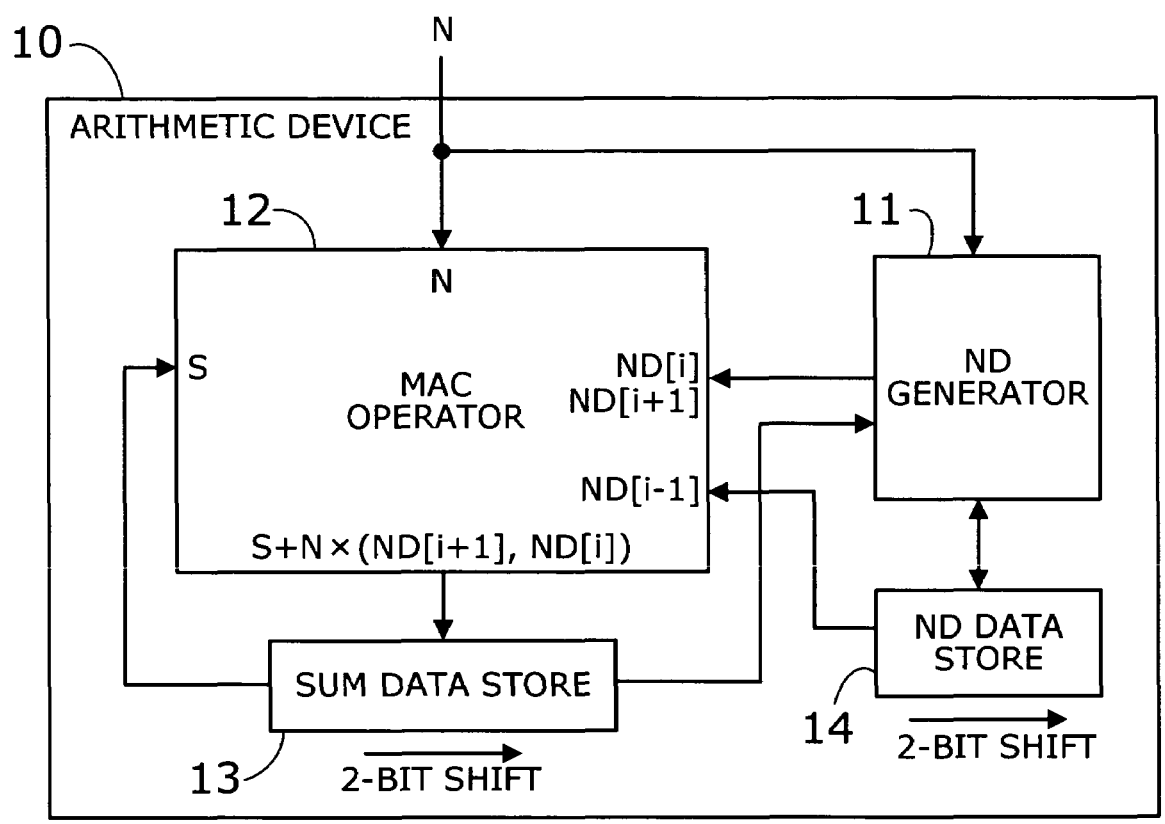
FIG. 1 gives an overview of an arithmetic device according to an embodiment of the present invention, explaining the principle of its structure and operation.

FIG. 1 gives an overview an arithmetic device according to an embodiment of the present invention, explaining the principle of its structure and operation. The illustrated arithmetic device 10 is designed to calculate effective lower bits of a parameter ND for Montgomery modular multiplication, where ND satisfies a mathematical condition of $R \times R^{-1} - N \times ND = 1$ for an integer N and a radix R. We assume that N is an odd integer, and that R is a power of 2. The arithmetic device 10 yields ND at a rate of k bits per clock cycle. For simplicity, FIG. 1 shows the case of k=2.

According to the present invention, the arithmetic device 10 has an ND generator 11 to generate an ND value, a multiplication-accumulation (MAC) operator 12 to calculate a sum of products, and a sum data store 13 to store a variable S (implying "sum"). The variable S actually represents a value obtained by shifting right the MAC operator's output by two bits. The arithmetic device 10 further has an ND data store 14 to store the produced ND value.

The ND generator 11 produces effective lower bits of ND at a rate of two bits per clock cycle, with reference to the least significant two bits of a given variable S, as well as to the least significant two bits of the odd positive integer N. The MAC operator 12 multiplies the produced 2-bit ND value by N and adds the resulting product to the variable S. Note here that, in this multiplication step, the MAC operator 12 actually uses only the effective lower bits of N as the multiplier (which holds true throughout the rest of the description). The sum data store 13 receives and stores the output of the MAC operator 12, with its bits shifted right by two. The content of this sum data store 13 will be used by the ND generator 11 as a new value of S in the subsequent clock cycle. The ND data store 14 receives and stores each 2-bit portion of ND that the ND generator 11 produces at every clock cycle, by shifting itself to the right by two bits.

Figure 2:
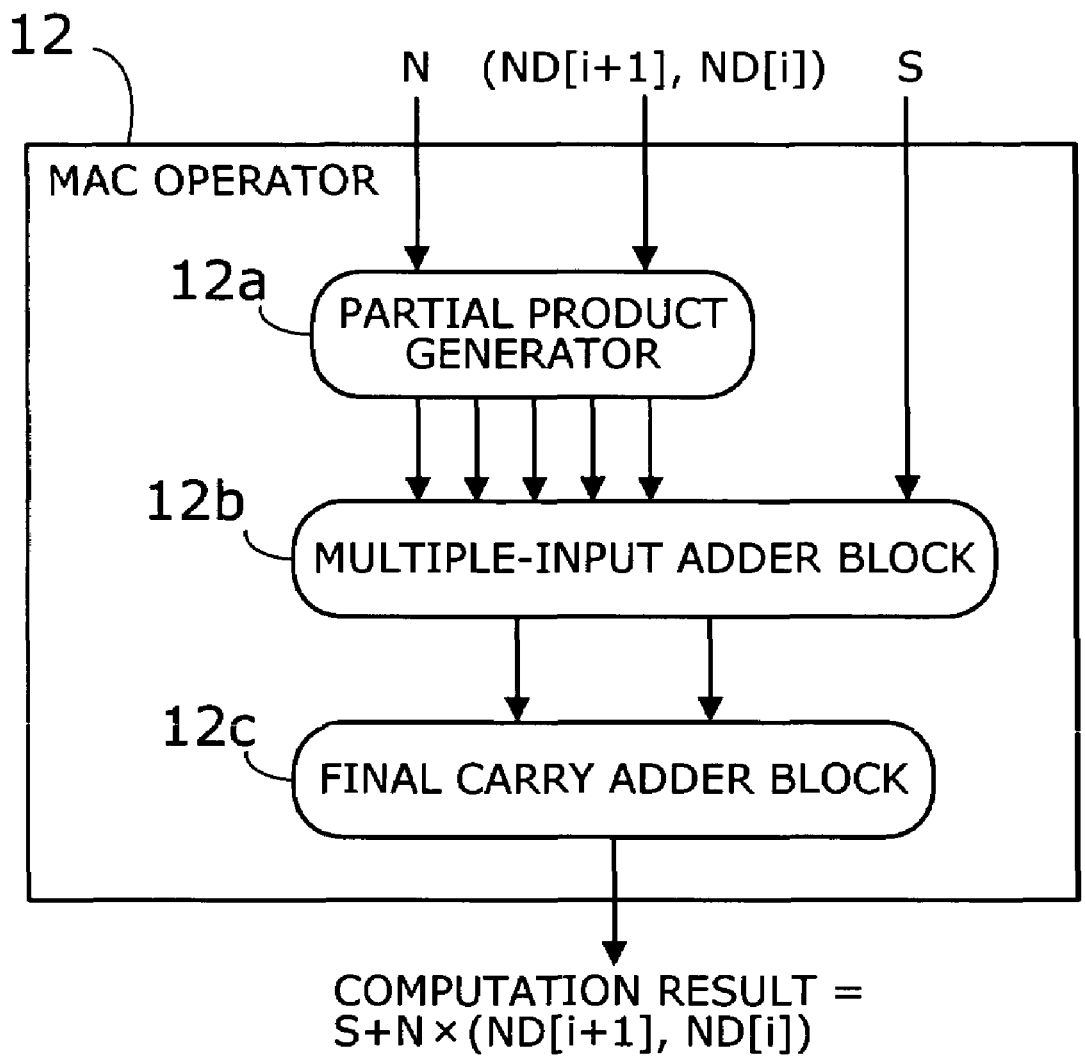
FIG. 2 is a block diagram of a MAC operator.

FIG. 2 is a block diagram of the MAC operator 12. The MAC operator 12 is composed of a partial product generator 12a, a multiple-input adder block 12b, and a final carry adder block 12c. The partial product generator 12a outputs a partial product of N×ND for (ND[i], ND[i+1]). This partial product generator 12a can be designed to use the Booth's algorithm, which produces a partial product for each three bits including ND[i+1], ND[i], and ND[i−1]. Here, ND[i−1] denotes a less significant bit immediately below N[i] and has been produced at the previous clock cycle. We will describe the algorithm in detail later.

The multiple-input adder block 12b adds the output of the partial product generator 12a to variable S. This multiple-input adder block 12b may have, for example, Wallace tree structure. The multiple-input adder block 12b outputs two values without carry delay time. The final carry adder block 12c receives those values to execute final carry addition.

Figure 3:
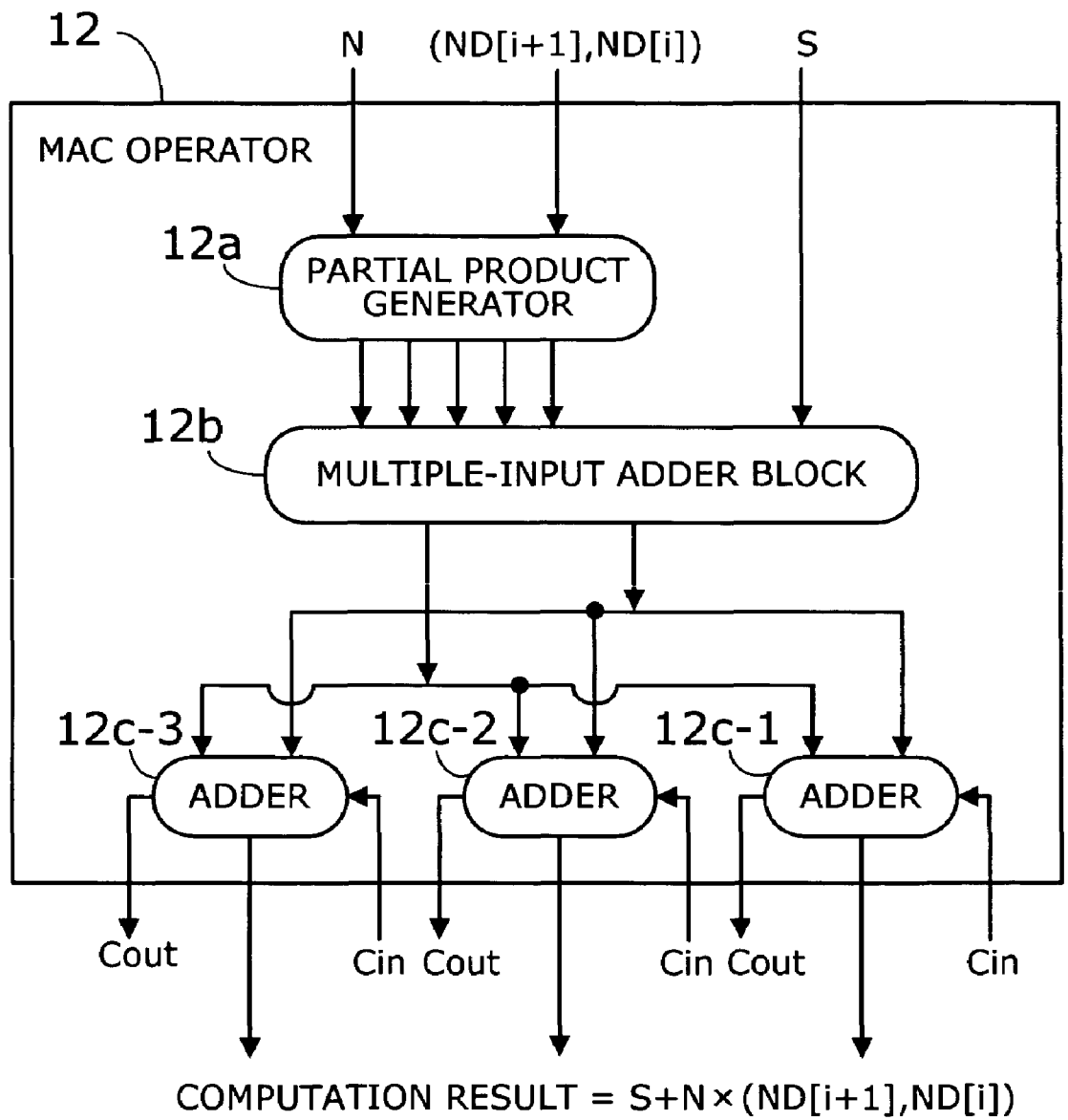
FIG. 3 is a block diagram of a MAC operator whose final carry adder is implemented in the form of a collection of discrete adders.

FIG. 3 is a block diagram of a MAC operator whose final carry adder is implemented in the form of a collection of discrete adders. This MAC operator uses some elements explained in FIG. 2. We affix like reference numerals to like elements, while omitting explanation for such elements.

The illustrated MAC operator 12 has three discrete adders 12c-1, 12c-2, and 12c-3 to provide the function of the final carry adder block 12c described in FIG. 2. By dividing its function in this way, we can reduce the delay of carry generation and propagation in the sum operation, thus enabling the MAC operator 12 to run at a higher clock frequency. The carry outputs Cout from those adders 12c-1, 12c-2, and 12c-3 are stored once in appropriate registers (not shown) for use as carry inputs Cin in the subsequent cycle of addition, as will be described in detail later.

As mentioned, Booth's algorithm is used in the partial product generator 12a. Generally, MAC operations with Booth's algorithm would necessitate sign correction for upper digits if the carry adder block is divided as illustrated in FIG. 3. The arithmetic device 10 of the present embodiment, however, does not require sign correction for upper digits, since unsolved digits are reduced two bits at a time, from upper digits to lower digits, as the processing cycles proceed.

We will now describe how the arithmetic device operates in the present embodiment. FIG. 4 shows an algorithm implemented in the arithmetic device according to the present embodiment of the invention. The algorithm is represented in the form of program code, where s (lowercase letter) denotes the number of effective lower bits of ND that are relevant to the calculation, and the number or symbol in square brackets following each variable S, N, or ND represents the position of a particular bit. The bit position is counted in the direction from LSB to MSB. For example, S[0] means the LSB of variable S, and ND[i] means the (i+1)th bit of ND, counted from its LSB.

Suppose now that an odd positive integer N is entered to the arithmetic device 10. This event first causes the sum data store 13 and ND data store 14 to initialize their respective variables S and ND to zero (i.e., S:=0, ND:=0). The fact that N is an odd positive integer justifies the algorithm of FIG. 4 to assume the LSB of N is always one (N[0]=1). This is why N[0] is not seen anywhere in the code of FIG. 4.

After the initialization, the arithmetic device 10 repeats a loop process specified in the "for" statement over a given range of variable i, from 0 to s−1. Specifically, the ND generator 11 produces effective lower bits of ND at a rate of two bits per clock cycle, from lower digits to upper digits, with reference to the lowest two bits of S and the same of N. The algorithm obtains effective lower bits of ND by taking advantage of the fact that the corresponding bits of N×ND are all ones. Actually, the loop in the code of FIG. 4 contains "if" and "else if" statements to generate each 2 bits of ND based on this principle. For example, the algorithm of FIG. 4 assigns "11" to (ND[i+1], ND[i]) if (S[1], S[0], N[1]) is "000." For another example, the algorithm assigns "01" to (ND[i+1], ND[i]) if (S[1], S[0], N[1]) is "001." In this way, the ND generator 11 decodes eight different states of (S[1], S[0], N[1]), ranging from "000" to "111," and translates them into corresponding two-bit ND values.

The MAC operator 12 uses the two-bit output (ND[i+1], ND[i]) of the ND generator 11, odd positive integer N, and variable S to calculate S+N×(ND[i+1], ND[i]). The resulting sum S is shifted right by two bits to update the sum data store 13. This two-bit shift right operation is expressed as ">>2" in the algorithm of FIG. 4.

The above operations take place in one clock cycle. As indicated by the parameter "step 2" in the "for" statement, the index i is incremented by two in preparation for another round of the loop in the subsequent clock cycle. The algorithm repeats the loop in this way until the incremented index i exceeds (s−1). Although the code of FIG. 4 does not explicitly shows, the resulting bits (ND[i+1], ND[i]) are loaded serially into the ND data store 14, with a two-bit right shift occurring each time the ND generator 11 finishes one round of the loop. Accordingly, the required number (s) of ND bits will be ready in the ND data store 14 when all the specified loop iterations are done.

As can be seen from the above, the arithmetic device 10 according to the present embodiment can produce ND at a rate of two bits per clock cycle by repeating a loop process s/2 times. This means that the proposed arithmetic device 10 needs only s/2 clock cycles to calculate ND. Think of an ND value whose effective lower bit length is 512 bits. The proposed arithmetic device 10 calculates this ND in 256 clock cycles, unlike conventional devices, which requires 512 clock cycles to do the same.

While the above explanation has assumed that the arithmetic device 10 outputs two bits at each step of calculation of ND, the invention should not be limited to that particular rate. The arithmetic device 10 may also be configured to produce four or eight bits at a time. In this case, the ND generator 11 calculates ND at a rate of four bits per clock cycle, with reference to lower four or eight bits of variable S, as well as to a given odd positive integer N. The MAC operator 12 multiplies the four-bit or eight-bit ND value by N and adds the resulting product to variable S. The sum data store 13 stores the MAC operation's result as a new value of variable S, after shifting it to the right by four or eight bits. The ND data store 14 takes in the four-bit or eight-bit output of the ND generator 11, by shifting itself to the right by four or eight bits.

The MAC operator 12 may be designed to use what is generally known as the Booth's algorithm for multiplication of numbers expressed in 2's complement. The following section will describe how the present embodiment operates, assuming the use of two-bit Booth's algorithm.

FIG. 5 shows an algorithm implemented in the MAC operator according to the present embodiment of the invention, particularly in the case where the Booth's algorithm is implemented. The statements shown in FIG. 5 are to be replaced with the steps within the "for" loop (i.e., steps within the braces) explained in FIG. 4. The algorithm of FIG. 5 consists of two parts. The first half is a process to be executed by the ND generator 11, which determines each two bits of ND. The second half is a multiplication-accumulation process to be executed by the MAC operator 12, which calculates S from ND and N according to Booth's algorithm. The Booth's algorithm corrects summation results in the current cycle by using a part of the ND value obtained in the previous cycle. The ND data store 14 serves this purpose by providing the MAC operator 12 with the previous ND value.

More specifically, the first half of the algorithm produces an ND value at a rate of two bits per clock cycle, from lower bits to upper bits. To calculate each two bits of ND, it refers to ND[i−1] (i.e., upper bit of the previous two-bit ND value), the least significant two bits of variable S, and the least significant two bits of the given number N, as can be seen in the "if" and "else if" statements. For example, if (ND[i−1], S[1], S[0], N[1]) is "0000," then the MAC operator 12 assigns "11" to (ND[i+1], ND[i]). If (ND[i−1], S[1], S[0], N[1]) is "1000," it assigns "10" to (ND[i+1], ND[i]). In this way, the first process yields two bits of ND corresponding to sixteen different patterns of (ND[i−1], S[1], S[0], N[1]), from "0000" to "1111."

Each time the ND generator 11 produces ND[i+1] and ND[i], the MAC operator 12 performs a MAC operation with Booth's algorithm, referring also to N, S, and ND[i−1]. To calculate N×ND, the two-bit Booth's algorithm produces a partial product corresponding to each different state of ND[i+

1], ND[i], and ND[i−1], where ND[i−1] is the upper one of the preceding two-bit output of the ND generator 11. This partial product has a particular value depending on the three-bit pattern of (ND[i+1], ND[i], ND[i−1]). More specifically, the partial product will have a value of: "N×0" when (ND[i+1], ND[i], ND[i−1]) is "000" or "111"; "N×1" when "001" or "010"; "N×2" when "011"; "N×(−2)" when "100"; and "N×(−1)" when "101" or "110." The second half of FIG. 5 shows this logic as a series of "if" and "else if" statements. From given values of ND[i+1], ND[i], and ND[i−1], those statements determine a three-bit value of N×ND, which is to be added to variable S. In FIG. 5, the term "N<<1" denotes a single-bit left shift operation applied to N, meaning "N×2," and the term "!N" denotes two's complement of N, meaning "N×(−1)."

The two-bit Booth's algorithm as such halves the number of partial products because each step eventually manipulates two bits at a time. The sum data store 13 stores the output of the MAC operator 12 as a new value of variable S, with its bits shifted right by two. This two-bit shift right operation is expressed as ">>2" in the algorithm of FIG. 5.

Figure 6:
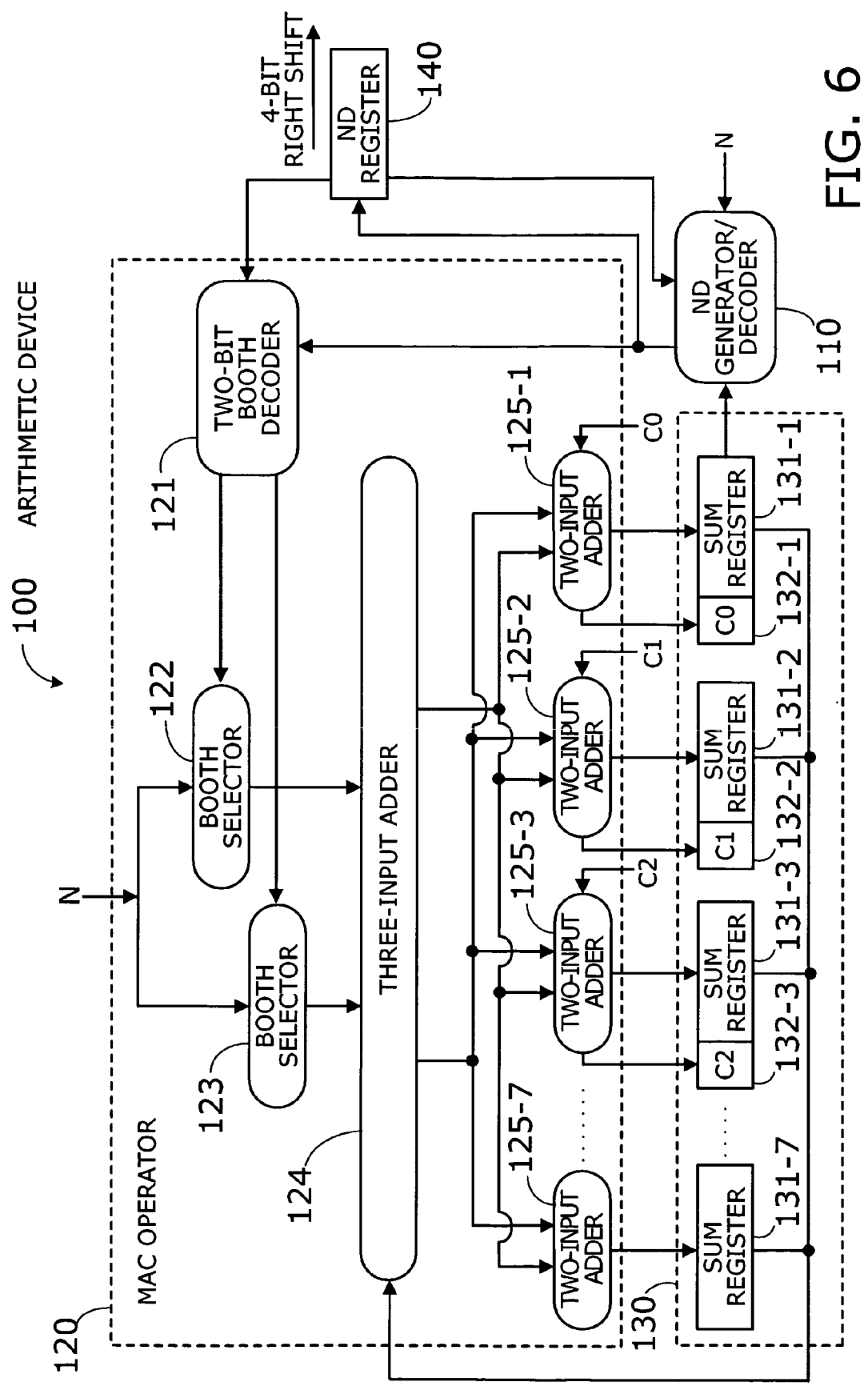
FIG. 6 shows a specific circuit configuration of the arithmetic device according to the present embodiment of the invention.
Figure 8:
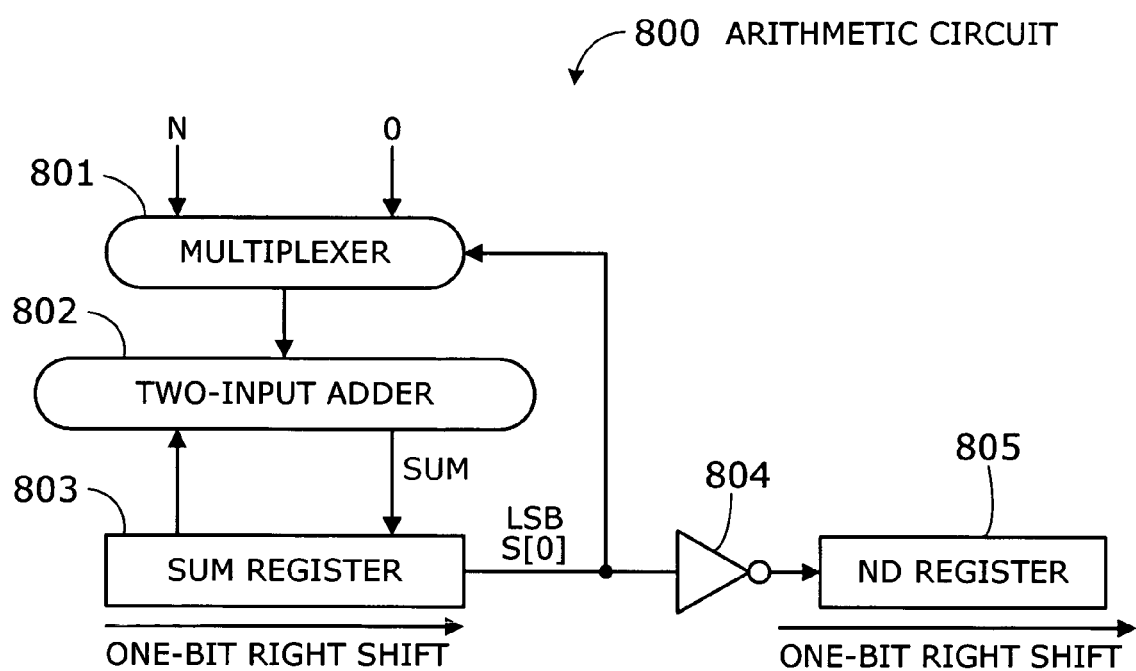
FIG. 8 shows the structure of a conventional arithmetic circuit which calculates an ND value.

Referring next to FIG. 6, we will now present a more specific circuit of the arithmetic device according to the present embodiment of the invention. We assume here that the effective lower bits of ND are 32 bits, and that the arithmetic device is designed to calculate four bits at each cycle.

The illustrated arithmetic device 100 comprises an ND generator/decoder 110, a MAC operator 120, a register block 130, and an ND register 140. The ND generator/decoder 110 serves as the ND generator 11 described earlier in FIG. 1. To produce ND values, the ND generator/decoder 110 uses an algorithm which is similar to the first half of the algorithm we have explained in FIG. 5, but whose data width is expanded so as to process four bits at a time. That is, the ND generator/decoder 110 produces four bits ND[i] to ND[i+3] at each clock cycle, with reference to the following inputs: lower four bits of variable S; lower four bits (three bits, actually, because N[0] is always one) of a given odd positive integer N; and ND[i−1] calculated in the preceding cycle. ND[i−1] is a less significant bit located immediately below ND[i].

The MAC operator 120 has functional elements for calculating partial products with two-bit Booth's algorithm and a collection of discrete final carry adders. It comprises a two-bit Booth decoder 121, two Booth selectors 122 and 123, a three-input adder 124, seven two-input adders 125-1, 125-2, 125-3, . . . 125-7, while FIG. 6 omits two-input adders 125-4, 125-5, and 125-6 because of space limitation.

The two-bit Booth decoder 121 produces control signal for use in the Booth selectors 122 and 123, from a four-bit value of ND supplied from the ND generator/decoder 110 and ND[i−1] supplied from the ND register 140. ND[i−1], immediately below ND[i], has been calculated in the preceding clock cycle and stored in the ND register 140. With those control signals, the Booth selectors 122 and 123 select and output one of N×2, N×1, N×0, N×(−1), and N×(−2). That is, the control signals serve as "if" and "else if" statements shown in the second half of FIG. 5. Two's complement of N is obtained by negating all bits of N and then adding one to the result. In the present case, however, there is no need to place an adder since N is an odd number. Further, no sign correction is required for upper bits since only lower bits are relevant in the calculation of ND.

The three-input adder 124 adds the outcomes of the Booth selectors 122 and 123 to variable S, thus outputting two values. These two values are supplied to seven two-input adders 125-1 through 125-7 for final carry addition. The two-input adder 125-7 for the most significant four bits has no carry output since it affects nothing.

The register block 130 serves as the sum data store 13 described in FIG. 1. It comprises seven four-bit sum registers 131-1, 131-2, 131-3, . . . 131-7. The register block 130 further comprises one-bit carry registers 132-1, 132-2, 132-3, . . . 132-6 to store the carries C0 to C5 produced by the two-input adders 125-1 to 125-6, respectively, in the MAC operator 120. (Because of limited space, FIG. 6 omits carry registers 132-4, 132-5, and 132-6 and their corresponding carries C3, C4, and C5.) Carries C0 to C5 stored in the carry registers 132-1 to 132-6 are supplied to the two-input adders 125-1 to 125-6, respectively, for use as an addend in the next cycle.

The ND register 140 serves as the ND data store 14 described earlier in FIG. 1. That is, the ND register 140 receives four-bit ND values from the ND generator 11 and stores them serially by shifting right its content by four bits each time a new value arrives.

In short, the arithmetic device 100 of FIG. 6 operates as follows. When an odd positive integer N is given, the arithmetic device 100 first initializes its internal registers. After that, the ND generator/decoder 110 begins producing an ND value, four bits at each cycle, from the following inputs: lower four bits of variable S; lower four bits of the given odd positive integer N; and ND[i−1] calculated in the preceding cycle. ND[i−1] is a less significant bit located immediately below ND[i] of interest. The two-bit Booth decoder 121 produces control signals from N[i−1] and the four-bit ND value of the ND generator/decoder 110 and sends them to the Booth selectors 122 and 123. According to the control signals, each Booth selector 122 and 123 outputs one of the following values: N×2, N×1, N×0, N×(−1), and N×(−2). Two outputs of the Booth selectors 122 and 123 are delivered to the three-input adder 124, where they are added to the variable S. Final carry addition for the resulting two outputs of the three-input adder 124 is performed by seven two-input adders 125-1, 125-2, 125-3, . . . 125-7. The resulting new sum is shifted to the right by four bits and then written back to the sum registers 131-1, 131-2, 131-3, . . . 131-7. Meanwhile, four-bit ND values produced by the ND generator/decoder 110 are loaded into the ND register 140 as each four-bit right shift operation takes place. The arithmetic device 100 repeats the above process eight times, thereby yielding a 32-bit ND value.

The above-described circuit employs a two-bit Booth decoder 121 and an ND generator/decoder 110 as separate components. These components, however, may be combined into a single block to implement both the first and second halves (or ND generation and Booth's algorithm) of FIG. 5. This circuit design will speed the calculation.

In the above examples, we have assumed 32-bit ND, four-bit shift per cycle, two-bit Booth's algorithm, and three-input adder for illustrative purposes. The present invention, however, is not limited to those particular bit lengths. Booth's algorithm may be expanded to more bits, and the adder may be designed to accept more input terms. Those modifications enable us to choose any other number of bits to shift the registers in each cycle.

We have also assumed, for illustrative purposes, that radix R is a power of 2, and that N is an odd integer. This should not be considered as limitations. What is required here is that R and N are relatively prime, and that R is larger than N.

The applications of the present invention include, for example, an ID card with encryption or decryption functions. In such applications, the Montgomery modular multiplication is used to implement RSA cryptosystem, one of the existing public-key systems. The proposed device produces ND at a rate of k bits per clock cycle, meaning that the present invention reduces the total number of clock cycles required in the calculated of ND. In other words, the present invention improves the speed of calculation of ND with many bits.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An encryption/decryption system for calculating effective lower bits of a parameter ND for Montgomery modular multiplication, the parameter ND satisfying $R \times R^{-1} - N \times ND = 1$ for an integer N and a radix R that is coprime to and greater than N, the system comprising:
   an input-output device;
   an ND generator that produces effective lower bits of an ND value at a rate of k bits per clock cycle, with reference to lower k bits of a variable S, as well as to lower k bits of the integer N;
   a multiplication-accumulation (MAC) operator that multiplies the produced k-bit ND value by the integer N and adds the resulting product to the variable S; and
   a sum data store that stores the variable S, wherein the variable S is updated by the MAC operator, with bits thereof shifted right by k bits, for use by said ND generator in a subsequent clock cycle,
   wherein k is an integer larger than 1.

2. The system according to claim 1, wherein said MAC operator comprises:
   a partial product generator that produces partial products,
   a multiple-input adder block that add the partial products to the variable S, and
   a final carry adder block that execute final carry addition based on an output of the multiple-input adder block.

3. The system according to claim 2, wherein the partial product generator employs Booth's algorithm.

4. The system according to claim 1, wherein the ND generator compares a combination of the lower k bits of the variable S and the lower k or less bits of the integer N with a plurality of predetermined values.

5. The system according to claim 4, wherein the comparison is repeated a number times, wherein the number of repeat times equals one half of the effective lower bits.

6. The system according to claim 4, wherein the partial product generator comprises:
   a Booth decoder that generates a control signal based on the effective lower bits of an ND value, and
   a Booth selector that generates the produces partial products based on the control signal.

7. The system according to claim 1, wherein the lower k or less bits of the integer N equals k−1.

8. The system according to claim 1, further comprising:
   a ND data store that stores the effective lower bits of the ND value.

9. The system according to claim 8, wherein the sum data store and the ND data store are initialized upon entry of the integer N into the system, the integer N being an odd positive integer.

10. The system according to claim 1, wherein said MAC operator comprises:
    a partial product generator that produces partial products,
    a multiple-input adder block that add the partial products to the variable S, and
    a plurality of discrete carry adders that execute final carry addition based on an output of the multiple-input adder block.

11. The system according to claim 10, wherein the partial product generator employs Booth's algorithm.

12. The system according to claim 11, wherein the partial product generator comprises:
    a Booth decoder that generates a control signal based on the effective lower bits of an ND value, and
    a Booth selector that generates the produces partial products based on the control signal.

13. The system according to claim 10, further comprising:
    a register that stores a carry output from the plurality of discrete carry adders.

14. The system according to claim 13, wherein the carry output is used by the multiple-input adder block in a next clock cycle.

15. The system according to claim 1, wherein the encryption/decryption system is used for encryption/decryption of a card.

16. The system of claim 1, wherein the output of the input-output device is encrypted.

17. The system of claim 1, wherein the output of the input-output device is decrypted.

* * * * *